United States Patent
Kumar

(10) Patent No.: US 10,381,817 B1
(45) Date of Patent: Aug. 13, 2019

(54) CABLE OIL BARRIER SYSTEMS FOR OIL-FILLED CABLE TERMINATIONS AND ASSEMBLIES AND METHODS INCLUDING THE SAME

(71) Applicant: TE Connectivity Corporation, Berwyn, PA (US)

(72) Inventor: Senthil A. Kumar, Morrisville, NC (US)

(73) Assignee: TE Connectivity Corporation, Berwyn, PA (US)

(*) Notice: Subject to any disclaimer, the term of this patent is extended or adjusted under 35 U.S.C. 154(b) by 0 days.

(21) Appl. No.: 15/907,763

(22) Filed: Feb. 28, 2018

(51) Int. Cl.
| | |
|---|---|
| H02G 15/04 | (2006.01) |
| H02G 15/013 | (2006.01) |
| H02G 15/007 | (2006.01) |
| H02G 15/00 | (2006.01) |

(52) U.S. Cl.
CPC ......... *H02G 15/043* (2013.01); *H02G 15/003* (2013.01); *H02G 15/007* (2013.01); *H02G 15/013* (2013.01)

(58) Field of Classification Search
CPC .. H02G 15/043; H02G 15/003; H02G 15/007; H02G 15/013
USPC ........................................................ 174/20
See application file for complete search history.

(56) References Cited

U.S. PATENT DOCUMENTS

| | | | |
|---|---|---|---|
| 3,035,113 A | 5/1962 | Danchuk | |
| 3,313,902 A | 4/1967 | Welling, et al. | |
| 3,715,449 A | 2/1973 | Cunningham et al. | |
| 3,716,652 A | 2/1973 | Lusk et al. | |
| 4,046,958 A | 9/1977 | Lusk | |
| 4,051,456 A | 9/1977 | Heilhecker et al. | |
| 4,079,186 A | 3/1978 | Lusk | |
| 4,228,318 A | * 10/1980 | Selsing | H02G 15/22 174/143 |
| 4,234,755 A | 11/1980 | Simons | |
| 4,431,861 A | 2/1984 | Clabburn et al. | |
| 4,943,685 A | 7/1990 | Reynaert | |
| 5,374,784 A | 12/1994 | Wentzel | |
| 8,579,033 B1 | 11/2013 | Robichaux et al. | |
| 9,871,363 B1 | 1/2018 | Czibur et al. | |

(Continued)

FOREIGN PATENT DOCUMENTS

| | | |
|---|---|---|
| WO | 20060015735 | 2/2006 |
| WO | 20120155934 | 11/2012 |

OTHER PUBLICATIONS

Brochure, "Oil-Filled Termination Up to 245 kV", Energy///Oil-Filled Termination, TE Connectivity, 4 pages, available as of filing date.

(Continued)

*Primary Examiner* — Dhiru R Patel
(74) *Attorney, Agent, or Firm* — Myers Bigel, P.A.

(57) ABSTRACT

An assembly for use with an oil-filled cable termination includes a cable gland, a cable received in the cable gland, and a stress cone received around the cable and spaced apart from the cable gland. The cable includes a central conductor and a polymeric insulation layer surrounding the central conductor. A lug is spaced apart from the stress cone and includes a barrel portion with the central conductor of the cable received in the barrel portion. An oil barrier system including an oil barrier layer surrounds the polymeric insulation layer of the cable between the stress cone and the lug.

18 Claims, 17 Drawing Sheets

(56) References Cited

U.S. PATENT DOCUMENTS

| | | |
|---|---|---|
| 2007/0292705 A1 | 12/2007 | Moncla et al. |
| 2009/0283294 A1 | 11/2009 | Bukovnik |
| 2010/0065302 A1 | 3/2010 | Nesbitt |
| 2010/0132976 A1 | 6/2010 | Tognali et al. |
| 2010/0181099 A1 | 7/2010 | Kameda et al. |
| 2012/0193142 A1 | 8/2012 | Mori et al. |
| 2013/0183003 A1 | 7/2013 | Cairns |
| 2013/0304179 A1 | 11/2013 | Bialas et al. |
| 2014/0076624 A1 | 3/2014 | Bohlin et al. |
| 2014/0182878 A1 | 7/2014 | Quaggia |
| 2018/0175603 A1 | 6/2018 | Czibur et al. |

OTHER PUBLICATIONS

Brochure, "Raychem High Voltage Cable Accessories up to 170 kV", Raychem from TE Connectivity, 56 pages, available as of filing date.

Sudkabel, Outdoor Termination and Accessories for High and Extra-High Voltage XLPE Cables, 2004, 19 pages.

\* cited by examiner

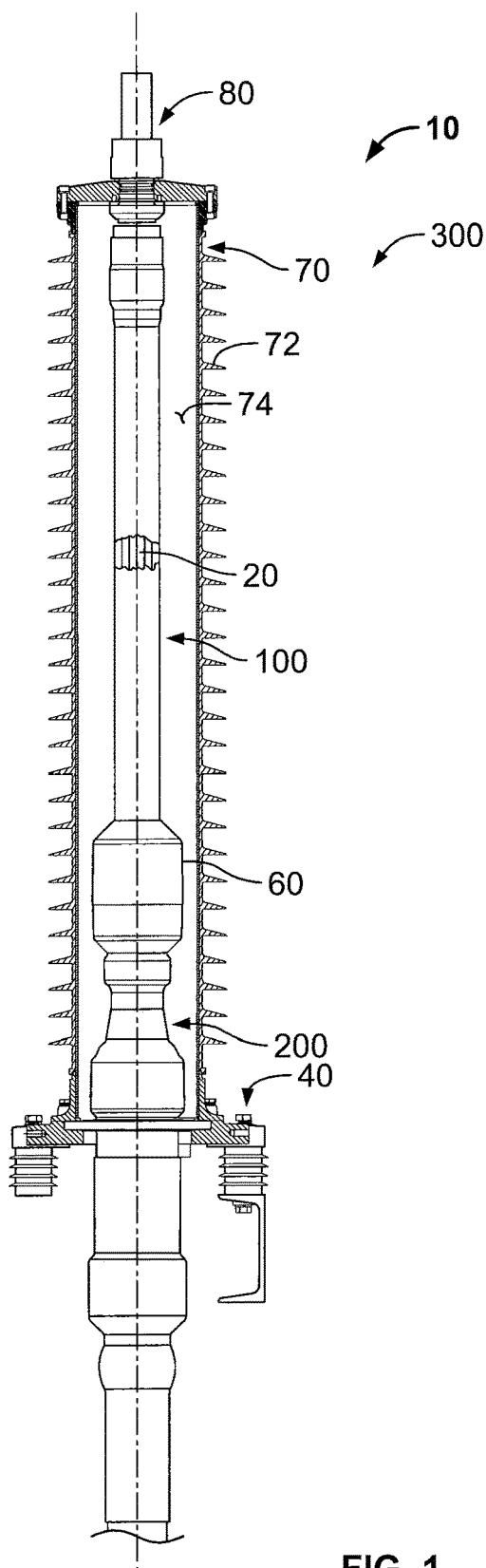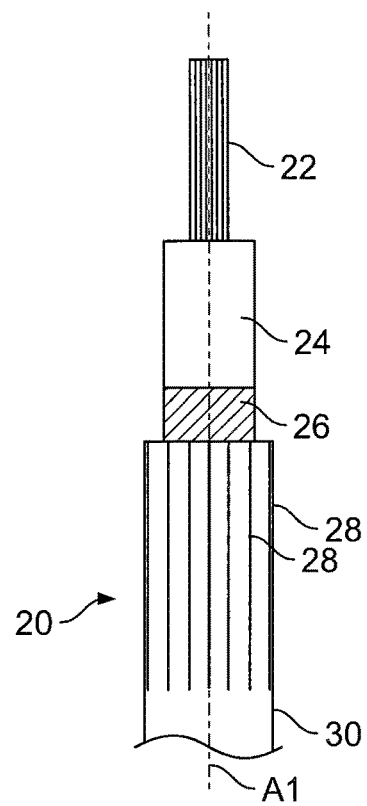
FIG. 1
FIG. 2

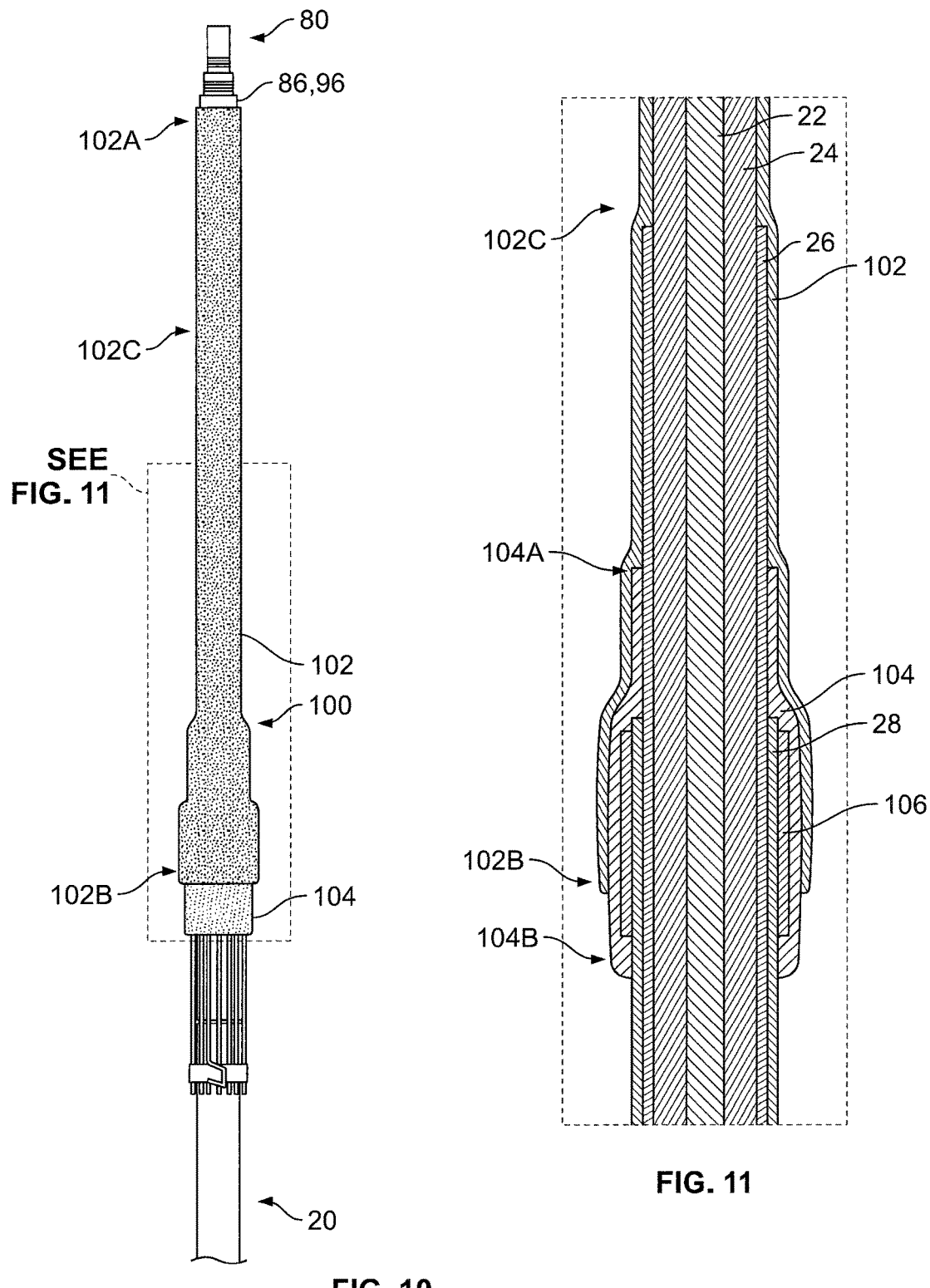

CABLE OIL BARRIER SYSTEMS FOR OIL-FILLED CABLE TERMINATIONS AND ASSEMBLIES AND METHODS INCLUDING THE SAME

BACKGROUND

Some cable terminations, such as those used for high voltage outdoor applications, include an electrically insulative housing around the cable. The housing is sometimes filled with oil to serve as a dielectric medium between the cable and the housing.

SUMMARY

Some embodiments of the present invention are directed to an assembly for use with an oil-filled cable termination. The assembly includes a cable gland, a cable received in the cable gland, a stress cone received around the cable and spaced apart from the cable gland, and a lug spaced apart from the stress cone. The cable includes a central conductor and a polymeric insulation layer surrounding the central conductor. The lug includes a barrel portion with the central conductor of the cable received in the barrel portion. The assembly includes an oil barrier system including an oil barrier layer surrounding the polymeric insulation layer of the cable between the stress cone and the lug.

Some other embodiments of the present invention are directed to a method for preparing an oil-filled cable termination assembly. The method includes: providing a cable having a distal end portion and including a central conductor and a polymeric insulation layer surrounding the central conductor; installing an oil barrier layer on the polymeric insulation layer of the cable; receiving the cable in a cable gland; and receiving a stress cone around the cable with the stress cone spaced apart from the cable gland. The oil barrier layer includes a first end portion and an opposite second end portion. The first end portion of the oil barrier layer is at the distal end portion of the cable. The oil barrier layer extends from the distal end portion of the cable to the stress cone.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 1 is a partial sectional and cutaway view of an oil-filled cable termination according to some embodiments of the present invention.

FIG. 2 is a side view of a cable used in the cable termination of FIG. 1 according to some embodiments.

FIG. 10 is a side view of the cable and the lug of FIG. 6 with an oil barrier system according to some other embodiments. The oil barrier system includes a first oil barrier layer applied on the cable and/or the lug and an optional second oil barrier layer applied on the cable.

FIG. 11 is a fragmentary sectional view of the cable and oil barrier system of FIG. 10 at the area indicated therein.

DETAILED DESCRIPTION

Figure 3:
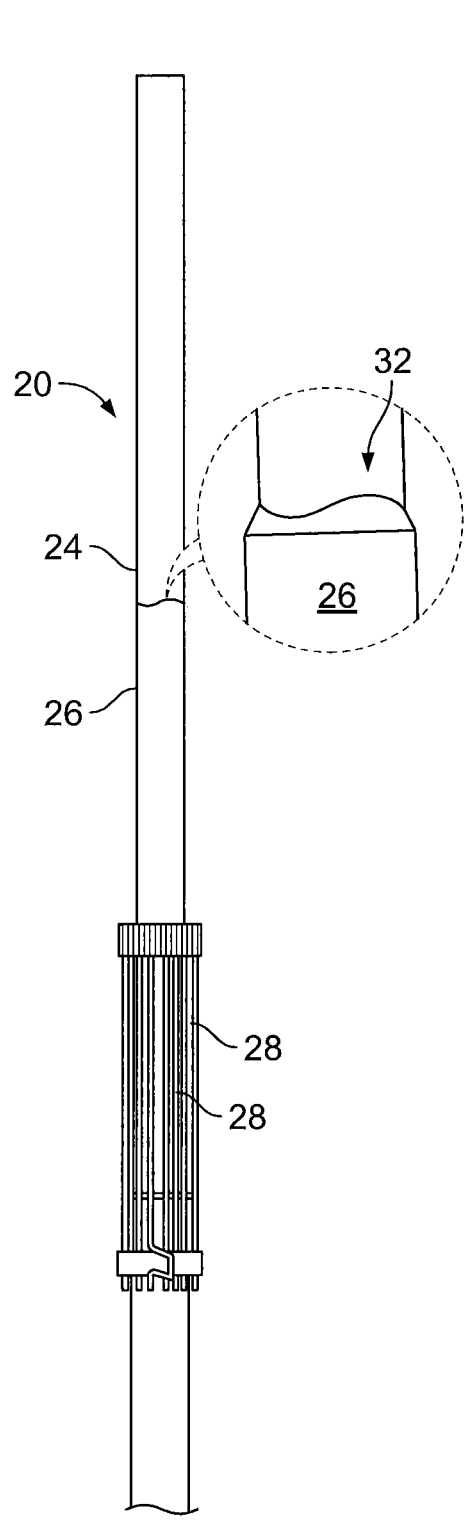
FIG. 3 is a side view illustrating the cable of FIG. 2 with a portion of a semiconductor layer thereof removed.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An oil-filled cable termination assembly 10 is illustrated in FIG. 1. The assembly 10 includes an electrical cable 20. As will be described in more detail below, the cable 20 is received through a base plate and cable gland assembly 40 and a stress cone 60. An insulator housing assembly 70 includes an insulator housing 72 that is at least partially filled with a fluid 74 such as oil. The oil may serve as a dielectric medium between the cable 20 and the housing 70. A conductor of the cable 20 is received in a lug 80. As will also be described in more detail below, an oil barrier assembly or system 100 provides a barrier between the oil 74 and one or more layers of the cable 20. A seal assembly or system 200 may be used to provide a seal around the cable 20 and/or the oil barrier system 100 between the base plate and gland assembly 40 and the stress cone 60.

The cable 20 may have the configuration shown in FIG. 2. The cable 20 includes a primary electrical conductor 22, a polymeric insulation layer 24, a semiconductor layer 26 and an outer jacket 30. The primary conductor 22 may be formed of any suitable electrically conductive material such as copper (solid or stranded). The polymeric insulation layer 24 may be formed of any suitable electrically insulative material such as crosslinked polyethylene (XLPE) or ethylene propylene rubber (EPR). The semiconductor layer 26 may be formed of any suitable semiconductor material such as carbon black with silicone. The jacket 30 may be formed of any suitable material such as EPDM or PVC.

An electromagnetic shield layer may be between the semiconductor layer 26 and the jacket 30. Neutral wires 28 from the electromagnetic shield layer may be folded back onto the jacket 30. The wires 28 may be formed of any suitable material such as copper.

The cable 20 may be a high voltage power cable (e.g., 69 kV to 230 kV). For example, the cable 20 may be a 69 kV, 138 kV or 230 kV power cable. The cable 20 may be an electrical power transmission cable.

Figure 4:
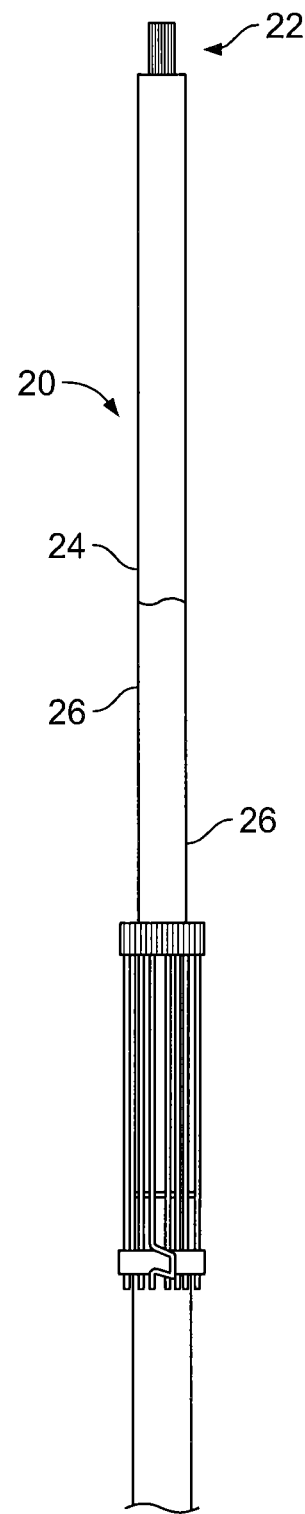
FIG. 4 is a side view illustrating the cable of FIG. 3 with an insulation layer of the cable removed to expose a conductor of the cable.

The cable 20 may be prepared as shown in FIGS. 3 and 4. A portion of the cable semiconductor layer 26 is removed to expose the cable insulation layer 24. The cable semiconductor layer 26 may be removed to have a chamfered portion 32. A portion of the cable conductor 22 may be exposed by removing a portion of the cable insulation layer 24.

Figure 5:
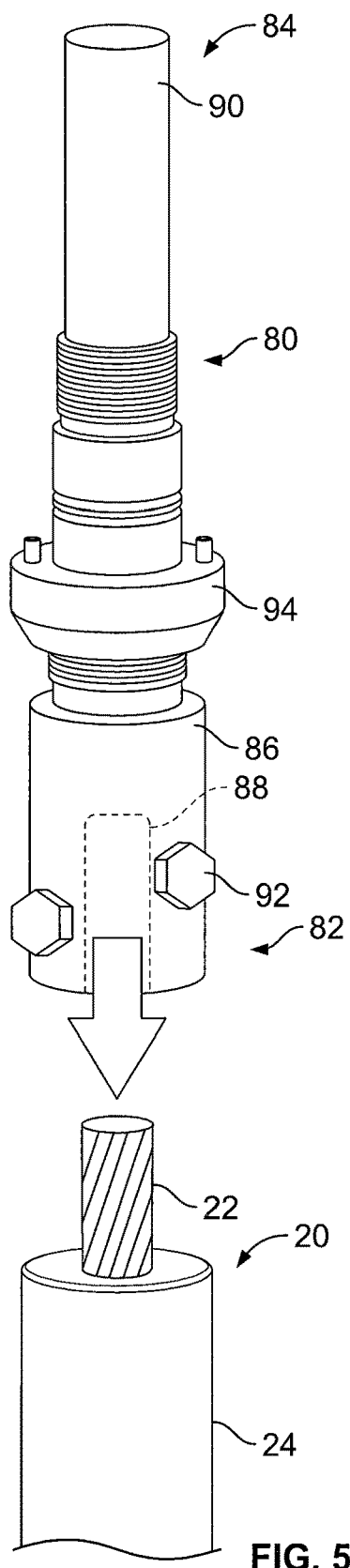
FIG. 5 is a fragmentary perspective view of the cable conductor of FIG. 4 being received in a lug.

Referring to FIG. 5, the exposed cable conductor 22 may be received in a lug 80. The lug 80 includes a first end portion 82 including a barrel 86 and a second opposite end portion 84 including a plug or pin 90. A central bore 88 is defined in the barrel 86 and is configured to receive the conductor 22 of the cable 20.

Figure 6:
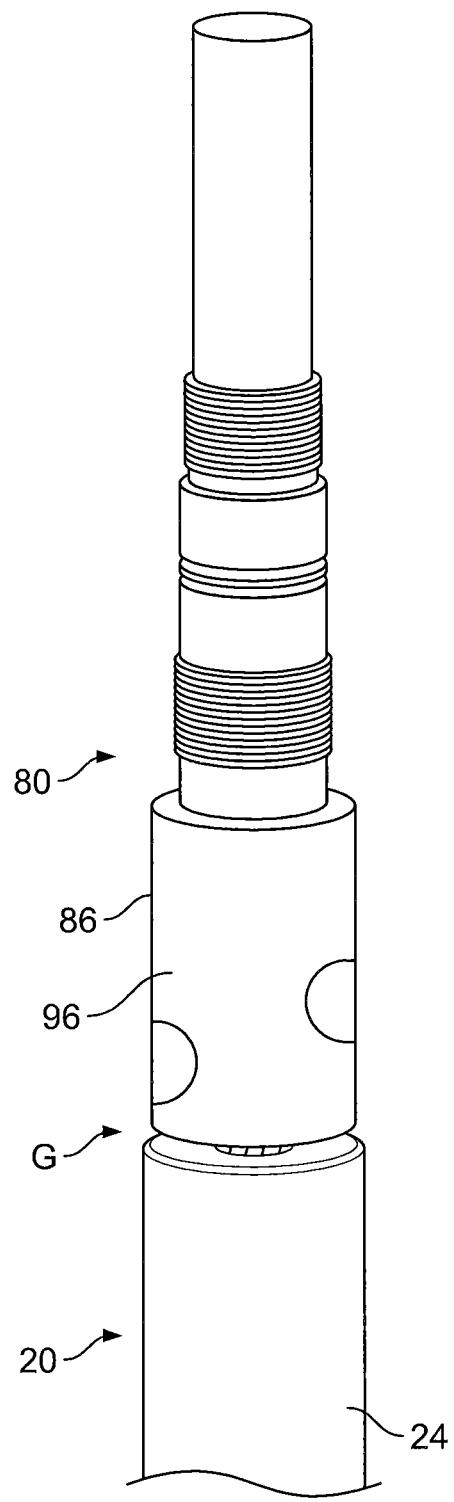
FIG. 6 is a fragmentary perspective view of the cable of FIG. 4 received in the lug of FIG. 5.

A plurality of shear bolts 92 may be held in and/or on the barrel 86. The shear bolts 92 may be tightened until heads of the shear bolts shear off as shown in FIG. 6. The shear bolts 92 may be configured such that the heads shear off when the proper tightening torque is applied to help ensure that the cable conductor 22 is securely held in the bore 88 of the barrel 86.

Figure 7:
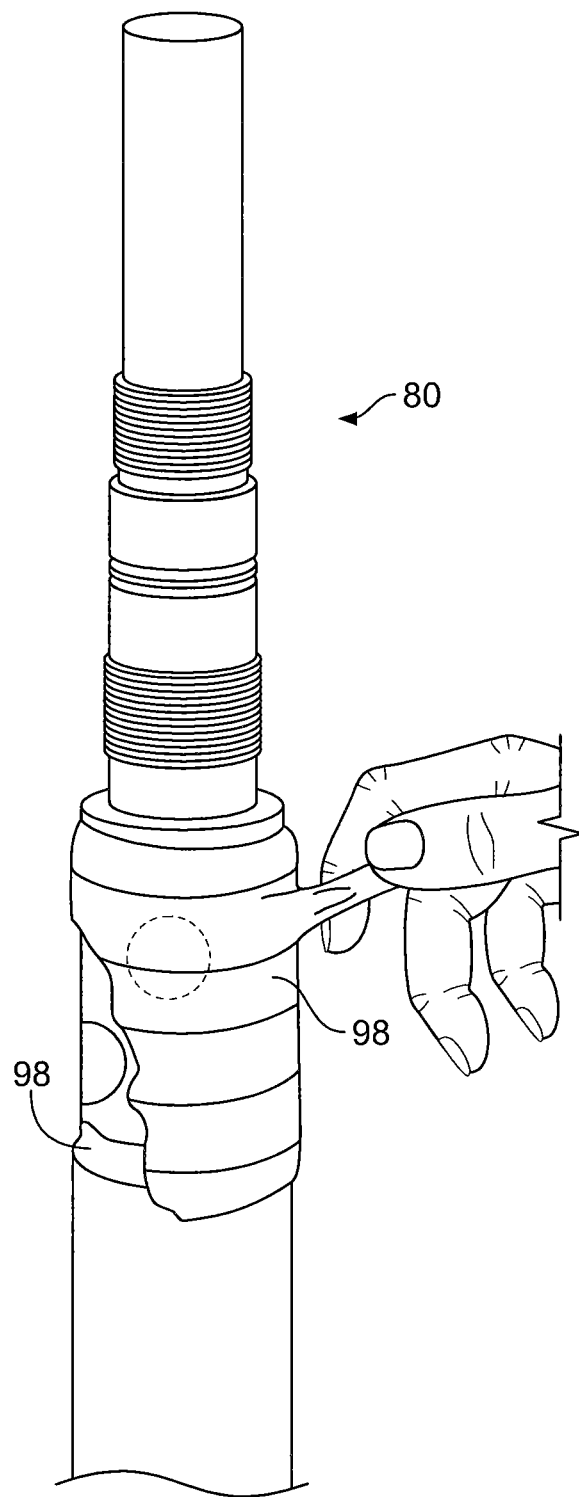
FIG. 7 is a fragmentary perspective view of the cable and the lug of FIG. 6 with mastic material being applied to the cable and/or the lug.

Still referring to FIG. 6, a gap G may be formed between the cable insulation layer 24 and the lug barrel 86. Referring to FIGS. 6 and 7, the gap G may be filled with mastic material 98 (e.g., yellow mastic tape). Mastic material 98 (e.g., yellow mastic tape) may also be applied around or on an outer surface 96 of the lug barrel 86.

Figures 8, 9:
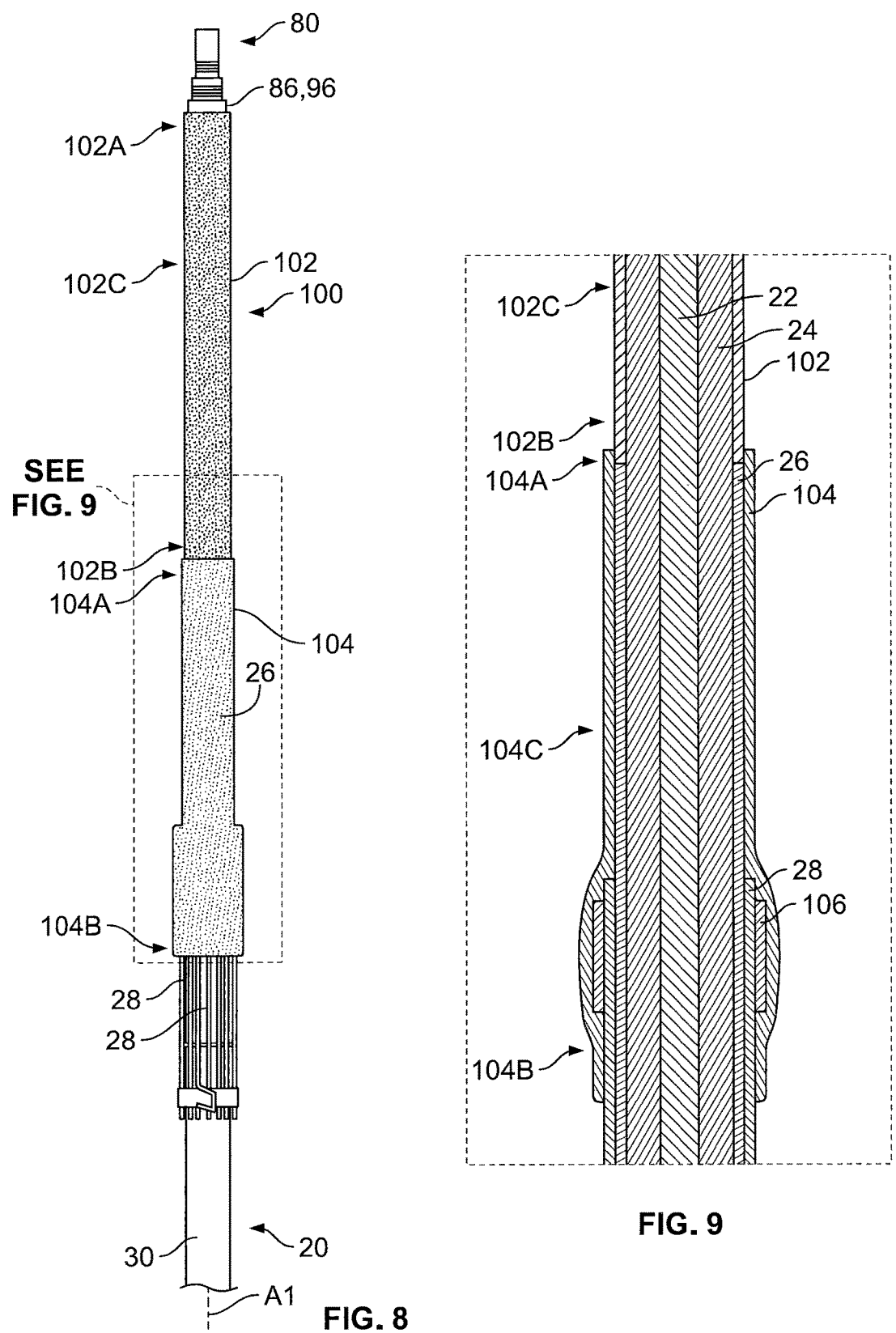
FIG. 8 is a side view of the cable and the lug of FIG. 6 with an oil barrier system according to some embodiments. The oil barrier system includes a first oil barrier layer applied on the cable and/or the lug and an optional second oil barrier layer applied on the cable.
FIG. 9 is a fragmentary sectional view of the cable and oil barrier system of FIG. 8 at the area indicated therein.

Referring to FIG. 8, the oil barrier assembly or system 100 may be applied to the cable 20. The oil barrier system 100 includes a first oil barrier layer 102. The first oil barrier layer 102 includes a first or upper end portion 102A, an opposite second or lower end portion 102B, and a central portion 102C therebetween.

In some embodiments, the first oil barrier layer 102 is formed by positioning a heat shrinkable tube around the cable 20 and/or the lug 80 and then heating the heat shrinkable tube such that the first oil barrier layer 102 conforms to the cable 20 and/or the lug 80 as shown in FIGS. 8 and 9.

In some other embodiments, the first oil barrier layer 102 is formed by a cold shrink tube or sleeve. The cold shrink tube may be pre-expanded on a holdout and the holdout may be positioned around the cable 20 and/or the lug 80. The holdout may be removed such that the first oil barrier layer 102 conforms to the cable 20 and/or the lug 80 as shown in FIGS. 8 and 9. In some embodiments, the first end portions 102A and/or the second end portion 102B may be rolled or slid axially (e.g., along or parallel to a longitudinal axis A1 of the cable 20) to the position shown in FIGS. 8 and 9.

The first end portion 102A of the first oil barrier layer 102 may overlap and/or contact the outer surface 96 of the lug barrel 86. Additionally or alternatively, the first end portion 102A of the first oil barrier layer 102 may overlap and/or contact the mastic material 98 (FIG. 7).

Referring to FIG. 9, the second end portion 102B of the first oil barrier layer 102 may be at or adjacent the interface of the exposed cable insulation layer 24 and the exposed cable semiconductor layer 26.

Referring to FIGS. 8 and 9, the central portion 102C of the first oil barrier layer 102 may surround the cable insulation layer 24.

The first oil barrier layer 102 may be an electrically insulating layer. The first oil barrier layer 102 may be elastomeric. The first oil barrier layer 102 may be or include EPDM. The first oil barrier layer 102 may have a thickness of between 1 and 10 mm and, in some embodiments, has a thickness of between 1 and 5 mm.

The oil barrier system 100 may optionally include a second oil barrier layer 104. The second oil barrier layer 104 includes a first or upper end portion 104A, an opposite second or lower end portion 104B, and a central portion 104C therebetween.

The second oil barrier layer 104 may be formed by heating a heat shrinkable tube in the same or similar manner as described above in reference to the first oil barrier layer 102. Alternatively, the second oil barrier layer 104 may be formed by applying a cold shrink tube or sleeve in the same or similar manner as described above in reference to the first oil barrier layer 102.

Referring to FIGS. 8 and 9, the first end portion 104A of the second oil barrier layer 104 may overlap and/or contact the first oil barrier layer 102 (e.g., the second end portion 102B of the first oil barrier layer 102). The second end portion 104B of the second oil barrier layer 104 may overlap and/or contact the neutral wires 28 of the cable 20.

The central portion 104C of the second oil barrier layer 104 may surround the cable semiconductor layer 26.

According to some embodiments, a mastic material layer 106 is between the second oil barrier layer 104 and the neutral wires 28 of the cable 20. More specifically, mastic material (e.g., mastic tape) forming the mastic layer 106 may be applied on the neutral wires 28 of the cable 20 before the second oil barrier layer 104 is installed.

The second oil barrier layer 104 may be an electrically conductive or semiconductor layer. The second oil barrier layer 104 may be elastomeric. The second oil barrier layer 104 may be or include EPDM. The second oil barrier layer 104 may have a thickness of between 1 and 10 mm and, in some embodiments, has a thickness of between 1 and 5 mm.

In some known oil-filled termination assemblies, a semiconductor layer is applied on the cable 20 and extends between the cable semiconductor layer 26 and the cable neutral wires 28. The semiconductor layer is typically formed by wrapping semiconductive tape (e.g., EPR tape) around the cable 20. For example, the semiconductor layer may be used as a stress gradient layer.

The use of a heat shrinkable tube or cold shrink tube or sleeve for the second oil barrier layer 104 may advantageously reduce installation time by eliminating the need to wrap semiconductive tape around the cable 20.

FIGS. 10 and 11 illustrate an alternative arrangement for the oil barrier system 100. The second oil barrier layer 104 may extend between the cable neutral wires 28 and the cable semiconductor layer 26. More specifically, the first end 104A of the second oil barrier layer 104 may overlap and/or contact the cable semiconductor layer 26 and the second end 104B of the second oil barrier layer 104 may overlap and/or contact the cable neutral wires 28.

The mastic layer 106 may be between the second oil barrier layer 104 and the neutral wires 28 of the cable 20.

The first oil barrier layer 102 may extend between the lug 80 and the second oil barrier layer 104. The first end portion 102A of the first oil barrier layer 102 may overlap and/or contact the lug barrel outer surface 96 and/or mastic material applied thereon as described above in reference to FIGS. 8 and 9.

The second end portion 102B of the first oil barrier layer 102 may overlap and/or contact the second oil barrier layer 104 (e.g., the first end portion 104A of the second oil barrier layer 104).

The central portion 102C of the first oil barrier layer 102 may surround the cable insulation layer 24. The central portion 102C of the first oil barrier layer 102 may also surround a portion of the cable semiconductor layer 26.

The first oil barrier layer 102, the second oil barrier layer 104 and the mastic layer 106 may have the same properties and may be applied in the same or substantially the same way as described above in reference to FIGS. 8 and 9.

Figure 12:
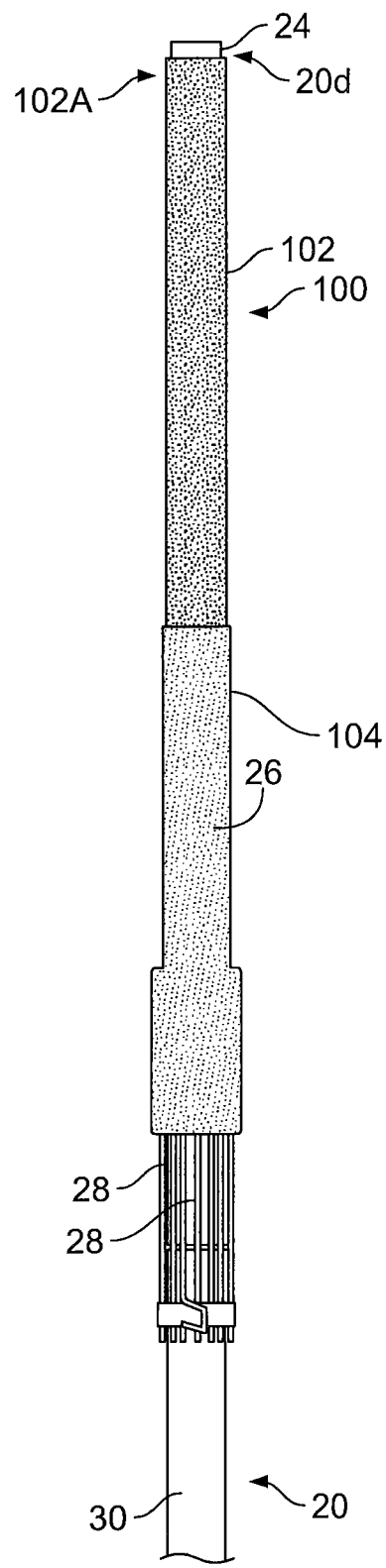
FIG. 12 is a side view of the cable of FIG. 3 with an oil barrier system according to some other embodiments. The oil barrier system includes a first oil barrier layer applied on the cable and an optional second oil barrier layer applied on the cable.

FIG. 12 illustrates the same arrangement as in FIGS. 8 and 9 except the lug 80 is not installed. The lug 80 may be installed as a later step as described in more detail below. A distal end portion 20d of the cable 20 including the cable insulation layer 24 may extend past the first end 102A of the first oil barrier layer 102.

Figure 13:
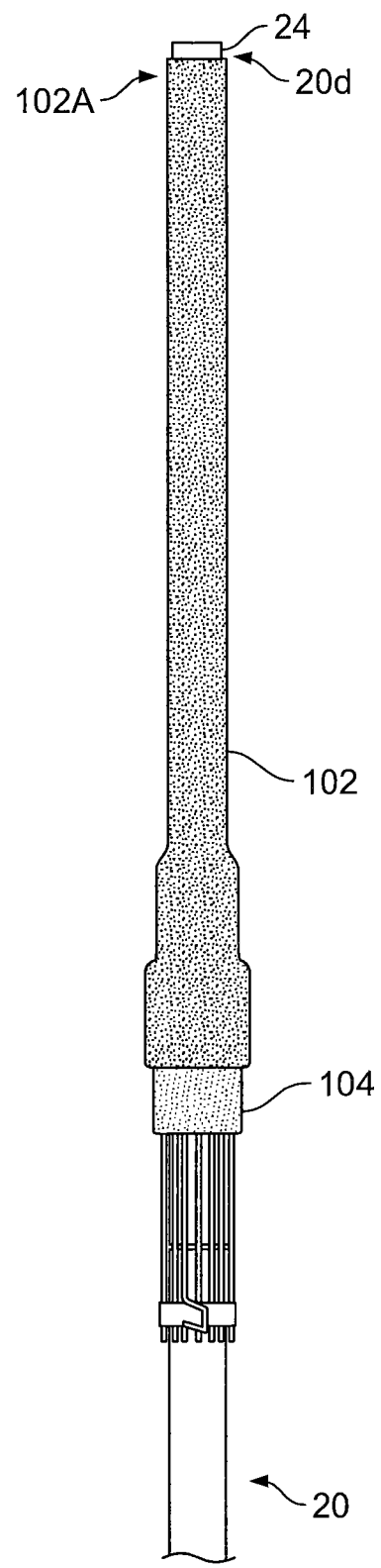
FIG. 13 is a side view of the cable of FIG. 3 with an oil barrier system according to some other embodiments. The oil barrier system includes a first oil barrier layer applied on the cable and an optional second oil barrier layer applied on the cable.

Similarly, FIG. 13 illustrates the same arrangement as in FIGS. 10 and 11 except the lug 80 is not installed. The lug 80 may be installed as a later step as described in more detail below. A distal end portion 20d of the cable 20 including the cable insulation layer 24 may extend past the first end 102A of the first oil barrier layer 102.

Figure 14:
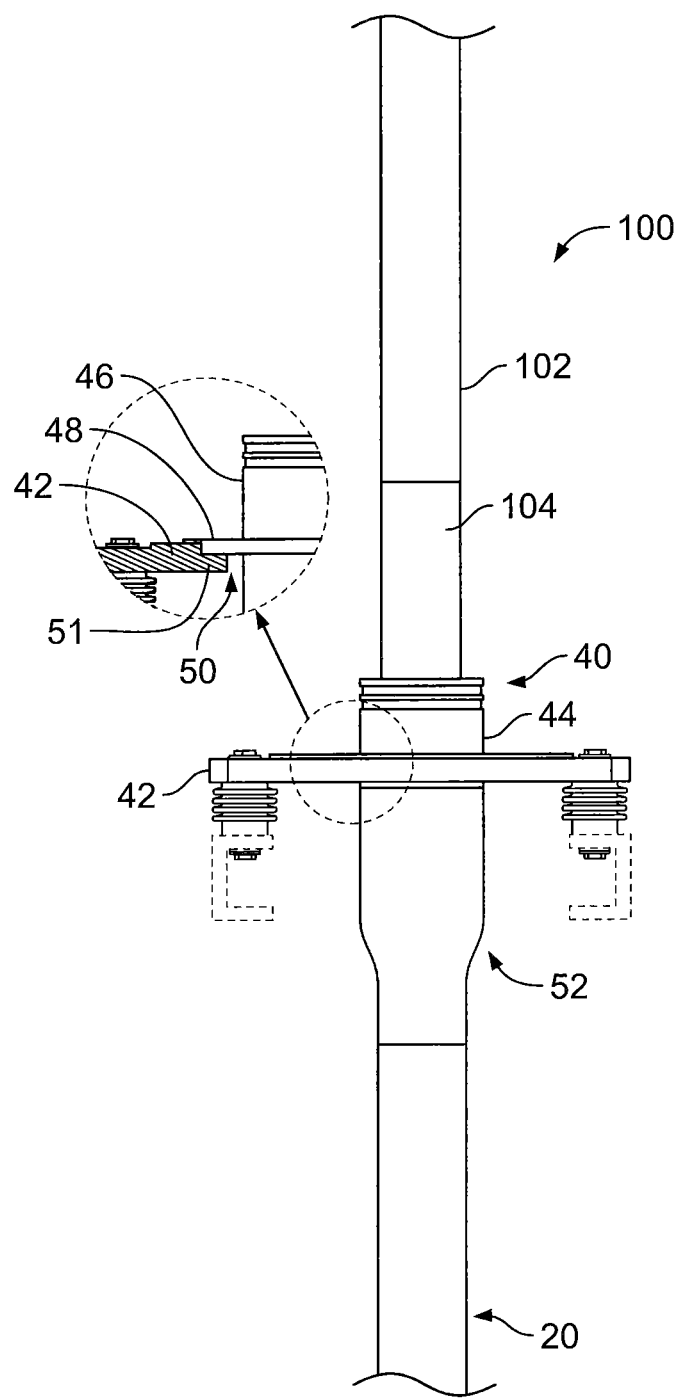
FIG. 14 is a side view illustrating an assembly including the cable and oil barrier system of FIG. 8 or FIG. 12 received in a cable gland according to some embodiments.

Referring to FIG. 14, the base plate and cable gland assembly 40 includes a base plate 42 and a cable gland 44. The gland 44 includes a tubular portion 46 that is sized and configured to receive the cable 20 and a plate portion 48 that surrounds the tubular portion 46. The plate portion 48 is sized and configured to fit (be seated) within an opening 50 in the base plate 42. The cable 20 may be received through the base plate 42 and then received in the cable gland 44.

More specifically, the base plate 42 may include a seat 51 that defines the opening 50. The cable gland plate portion 48 may be held on the seat 51 and the cable 20 and the cable gland tubular portion 46 may extend through the opening 50.

As understood by those skilled in the art, layers such as fabric layers may be applied to the cable 20 and be surrounded by the cable gland 44. As also understood by those skilled in the art, a lower seal assembly 52 may provide a seal between the cable 20 and a lower portion of the gland 44 (e.g., a lower portion of the gland tubular portion 46). For example, the seal assembly 52 may include one or more fabric layers, one or more mastic layers and/or heat shrinkable tubing.

Figure 15:
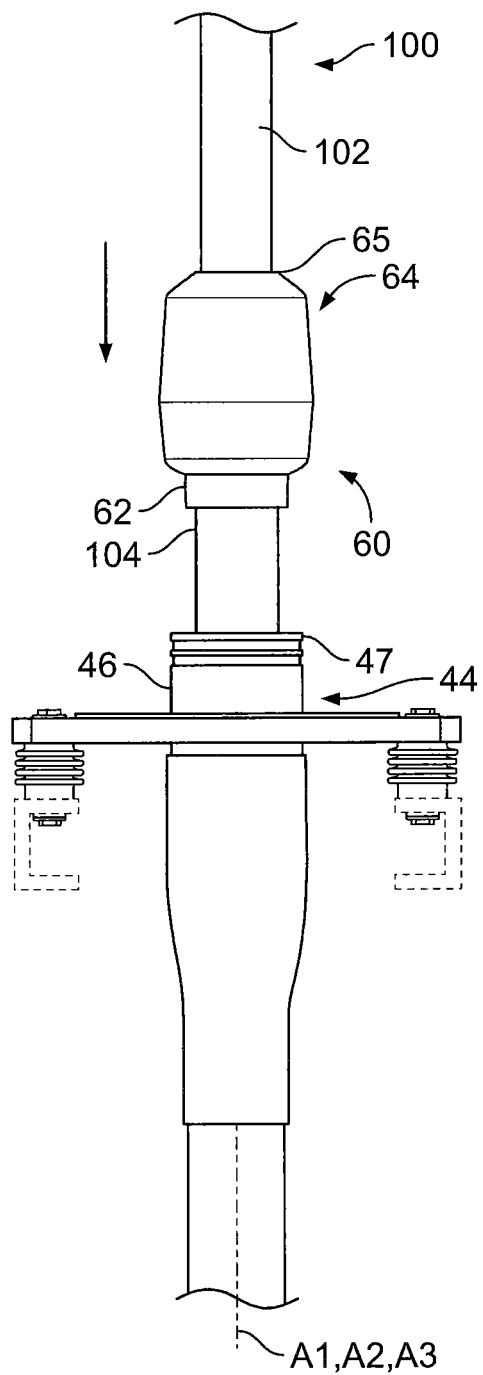
FIG. 15 is a side view illustrating an assembly including a stress cone received around the cable and oil barrier system of FIG. 14 according to some embodiments.

Referring to FIG. 15, the stress cone 60 is urged downwardly with the stress cone 60 surrounding the cable 20 and the oil barrier system 100. The stress cone 60 includes a lower conductive collar portion 62 and an upper insulating or non-conductive portion 64.

According to some embodiments, the stress cone 60 is installed such that the collar portion 62 surrounds the lower portion 102B of the first oil barrier layer 102 and/or the upper portion 104A of the second oil barrier layer 104 (FIGS. 8 and 9). The stress cone collar portion 62 may contact the lower portion 102B of the first oil barrier layer 102 and/or the upper portion 104A of the second oil barrier layer 104. The upper portion 64 of the stress cone 60 may surround the central portion 102C of the first oil barrier layer 102. A top 65 of the stress cone 60 (FIG. 15) may contact the central portion 102C of the first oil barrier layer 102.

According to some embodiments, the stress cone 60 is installed such that the stress cone 60 and/or the collar portion 62 thereof surrounds the central portion 102C of the first oil barrier layer 102 (FIGS. 10 and 11). The stress cone collar portion 62 may contact the central portion 102C of the first oil barrier layer 102. The upper portion 64 of the stress cone may surround the central portion 102C of the first oil barrier layer 102. The top 65 of the stress cone 60 (FIG. 15) may contact the central portion 102C of the first oil barrier layer 102.

According to some embodiments, with the cable gland 44 and the stress cone 60 installed around the cable 20, a longitudinal axis A2 of the cable gland 44 (or the cable gland tubular portion 46) and/or a longitudinal axis A3 of the stress cone 60 may coincide or substantially coincide with a longitudinal axis A1 of the cable 20.

Figure 16A:
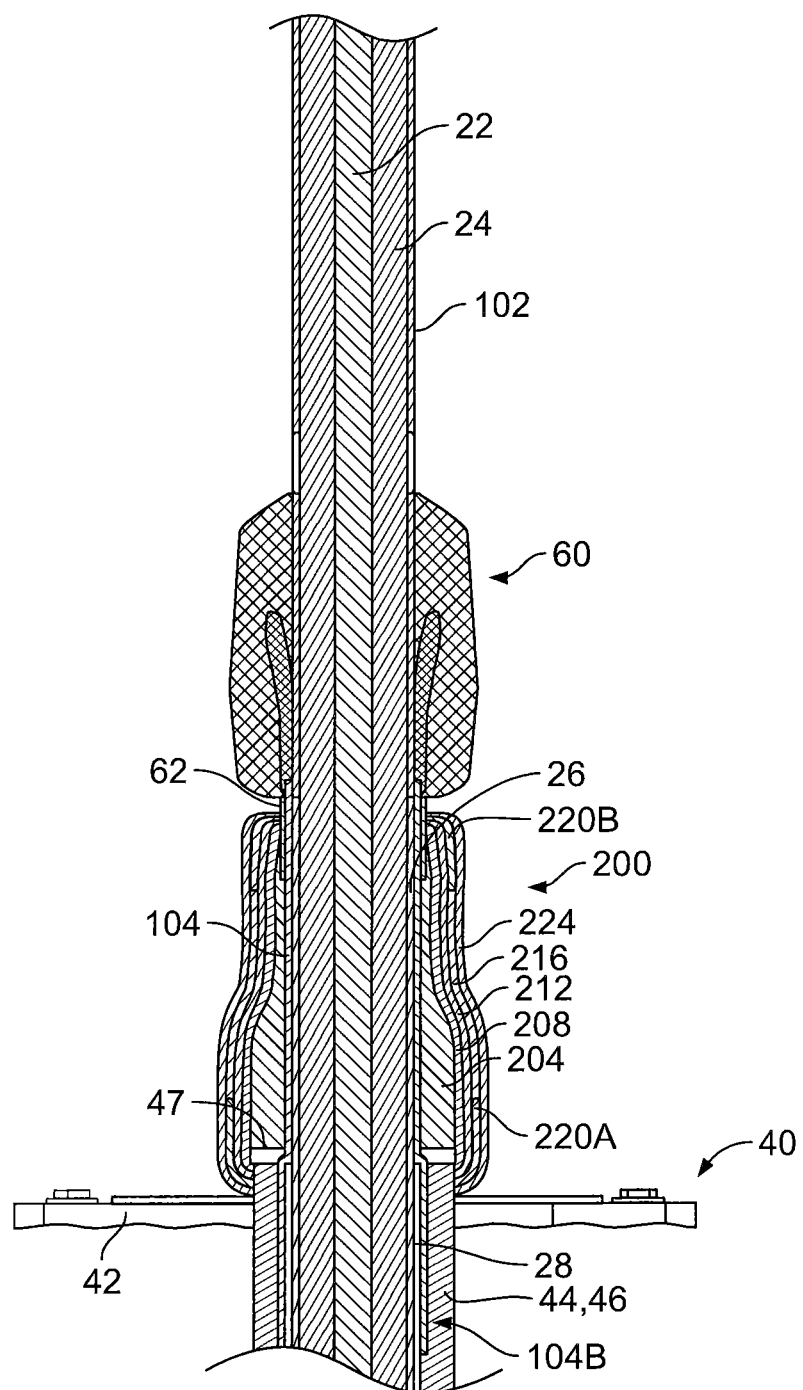
FIG. 16A is a fragmentary sectional view illustrating an assembly including a cable seal system surrounding the cable and/or the oil barrier system and extending between the stress cone and the cable gland of FIGS. 14 and 15.
Figure 16B:
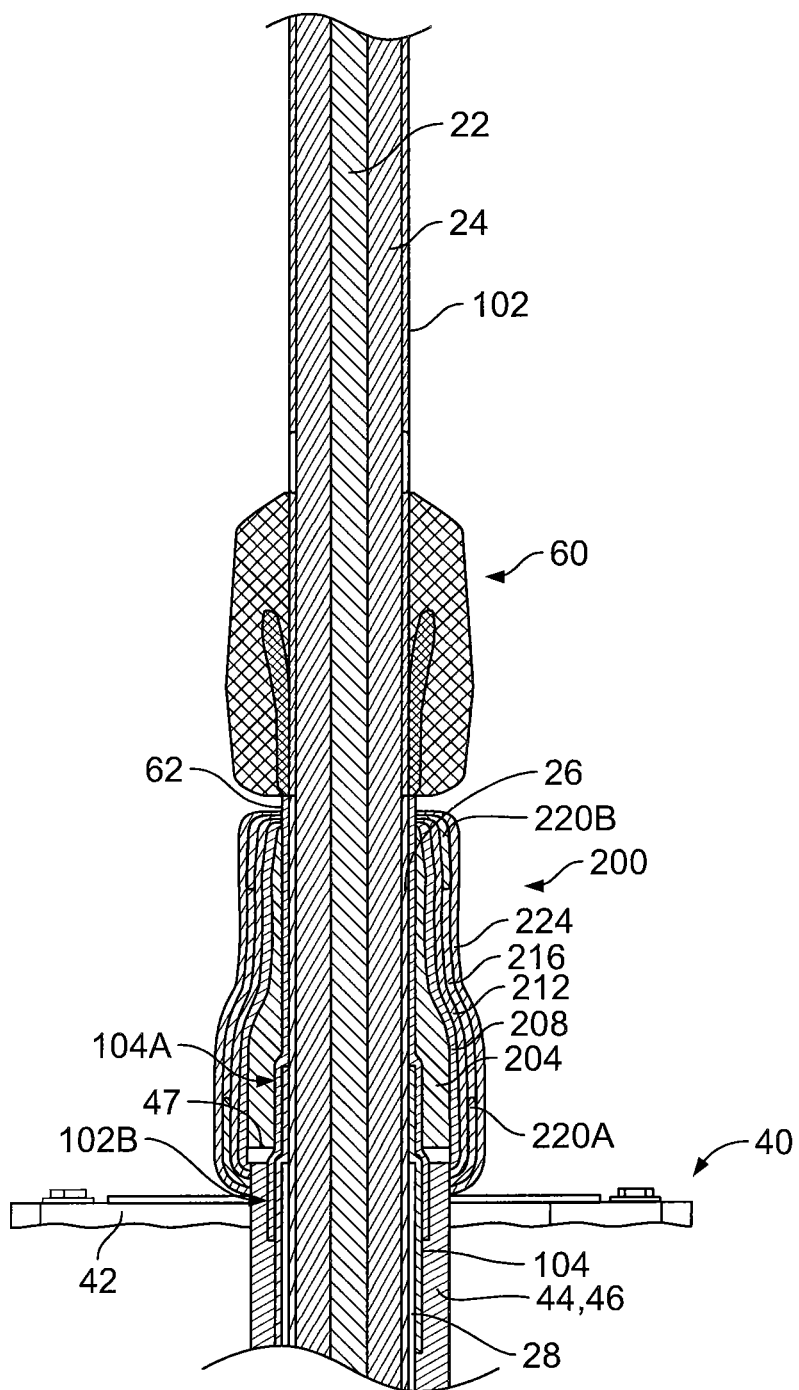
FIG. 16B is a fragmentary sectional view illustrating an assembly including the cable and oil barrier system of FIG. 10 or FIG. 13 received in a cable gland and a stress cone received around the cable and oil barrier system. The assembly includes a cable seal system surrounding the cable and/or the oil barrier system and extending between the stress cone and the cable gland.

Referring to FIGS. 16A and 16B, an oil seal system 200 may be installed on the cable 20 and/or the oil barrier system 100. The oil seal system 200 extends from the cable gland 44 to the stress cone 60. The seal system 200 may include a first layer that is a semiconductor layer 204. The semiconductor layer 204 may be formed by wrapping semiconductor tape around the cable 20 and/or the oil barrier system 100. For example, when the second oil barrier layer 104 is used in the embodiment illustrated in FIGS. 8 and 9, the semiconductor layer 204 may be applied around the second oil barrier layer 104 (FIG. 16A). Alternatively, the semiconductor layer 204 may be applied around the cable semiconductor layer 26 (e.g., when the second oil barrier layer 104 is not used).

With the embodiment illustrated in FIGS. 10 and 11, the semiconductor layer 204 may be applied around the first oil barrier layer 102 (FIG. 16B).

According to some embodiments, the semiconductor layer 204 is formed of semiconductive EPR material or tape.

An electrically conductive mesh layer 208 may be applied over the semiconductor layer 204. The electrically conductive mesh layer 208 may be a copper mesh layer formed by wrapping copper mesh around the semiconductor layer 204.

A first oil seal layer 212 may be applied over the copper mesh layer 208. The first oil seal layer 212 may be formed by wrapping tape around the copper mesh layer 208. According to some embodiments, the first oil seal layer 212 is formed by EPR rubber-based self-amalgamating tape.

A second oil seal layer 216 may be applied over the first oil seal layer 212. The second oil seal layer 216 may be formed by wrapping tape around the first oil seal layer 212. The tape may be any suitable self-amalgamating tape. According to some embodiments, the tape is a fusible silicone tape.

First and second spaced apart mastic material layers 220A, 220B may be applied over the second oil seal layer 216. Mastic material such as mastic tape may be applied to form the mastic layers 220A, 220B. A suitable mastic material is sealing mastic tape or material available from TE Connectivity.

A heat shrinkable tube 224 may be installed over the first and second mastic layers 220A, 220B. As understood by those skilled in the art, the heat shrinkable tube 224 is secured around the first and second oil barrier layers 220A, 220B by applying heat such that the heat shrinkable tube 224 shrinks in place. A suitable heat shrinkable tube is the WCSM-250/65-340/S heat shrinkable tube available from TE Connectivity. According to some embodiments, the heat shrinkable tube 224 includes EPDM rubber.

Figure 17:
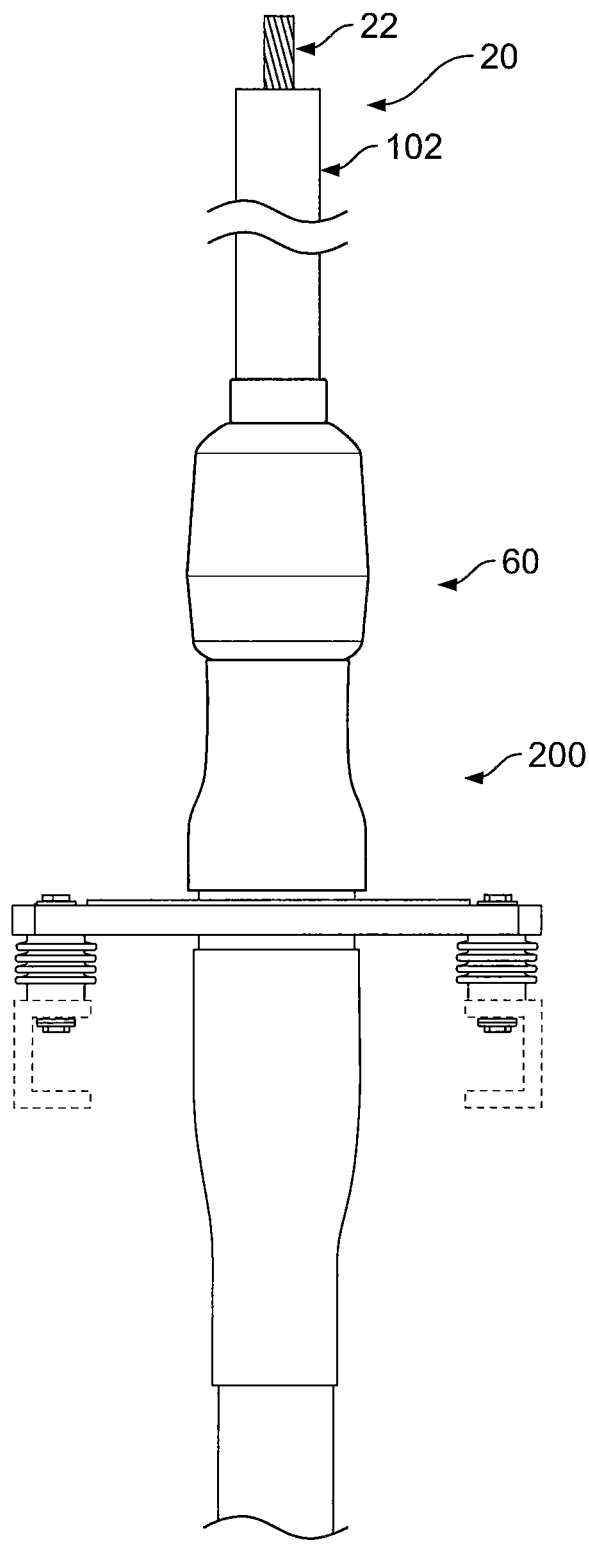
FIG. 17 is a side view of the assembly of FIG. 16A or FIG. 16B with an insulation layer of the cable removed to expose a conductor of the cable according to some embodiments.
Figures 18, 19:
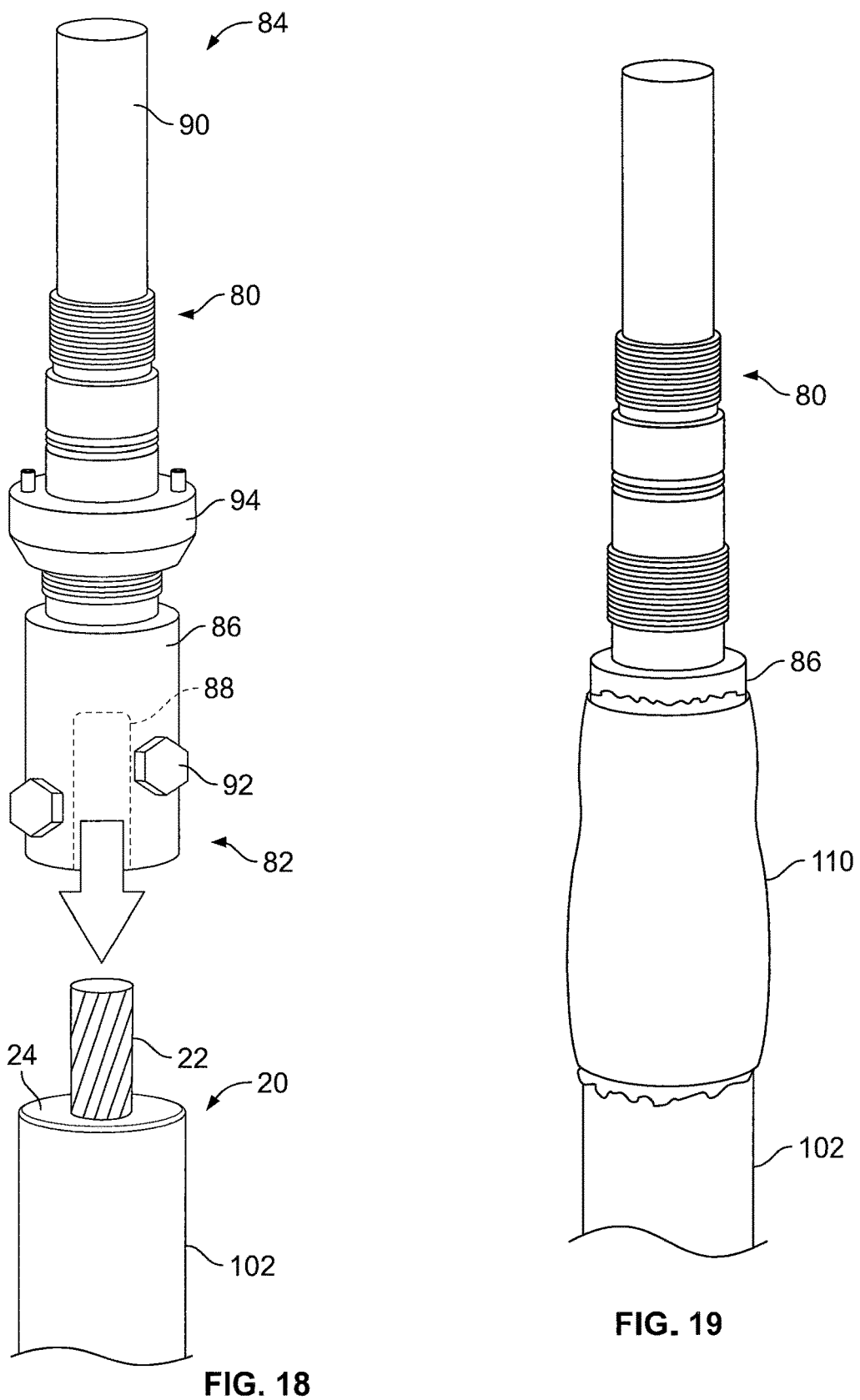
FIG. 18 is a fragmentary perspective view of the cable conductor of FIG. 17 being received in a lug.
FIG. 19 is a fragmentary perspective view of an upper oil seal layer applied on the lug and/or an oil barrier layer of FIG. 18.

If the cable 20 is prepared as shown in FIG. 12 or 13, the conductor 22 of the cable 20 may be exposed by removing a portion of the insulation layer 24 of the cable 20 as shown in FIG. 17. Referring to FIG. 18, the conductor 22 is then received in the lug 90.

A seal 110 may be applied around the lug 80 and/or the first oil barrier layer 102. The seal 110 may be formed by using a heat shrinkable or a cold shrink tube or sleeve that extends between the lug barrel 86 and the first oil barrier layer 102. In addition, mastic material (e.g., the mastic material 98 shown in FIG. 7) may be applied on the lug barrel 86 and the first oil barrier layer 102 before installing the tube or sleeve.

Figure 20:
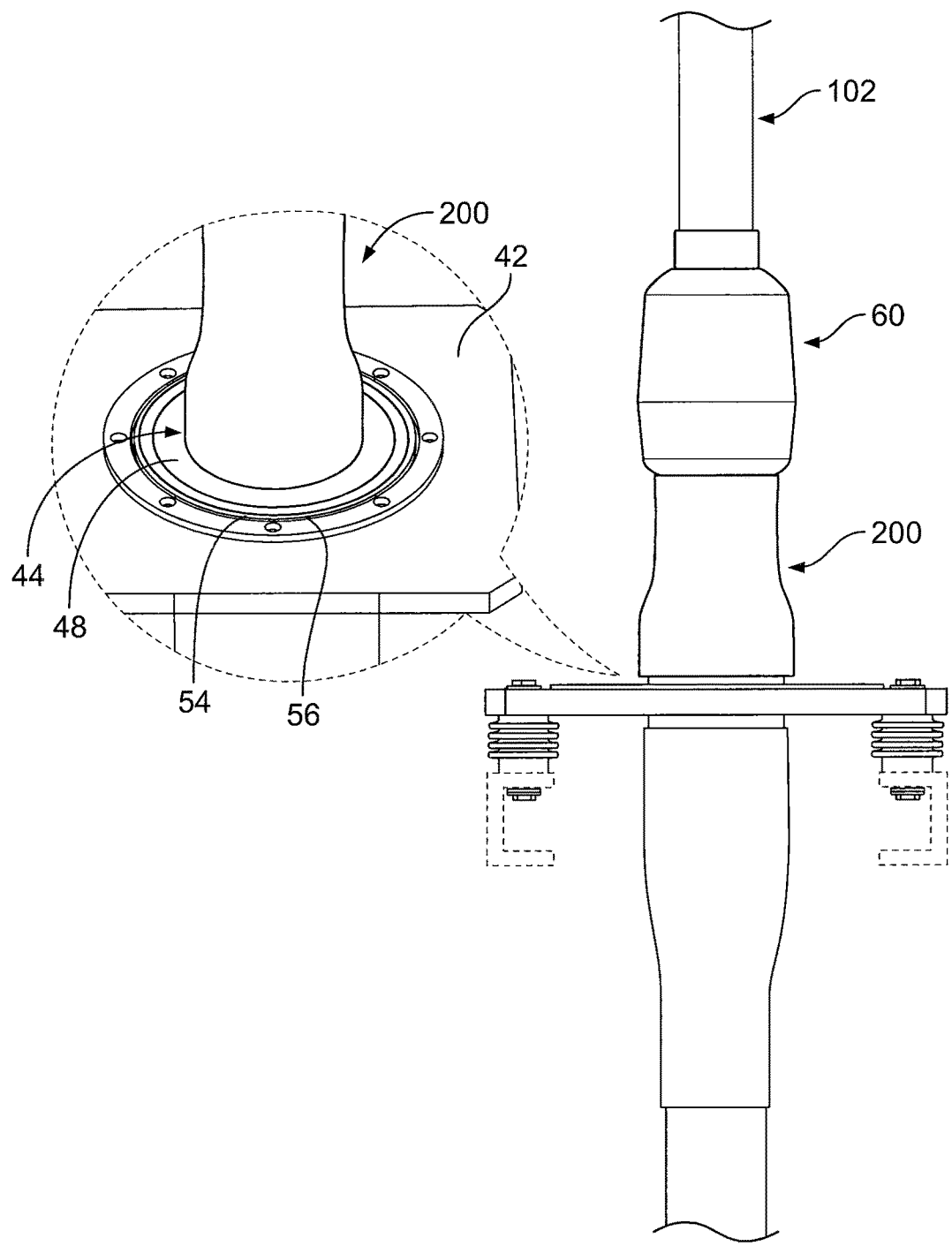
FIG. 20 includes a fragmentary side view and a fragmentary perspective view of the assembly of FIG. 16A or FIG. 16B.
Figure 21:
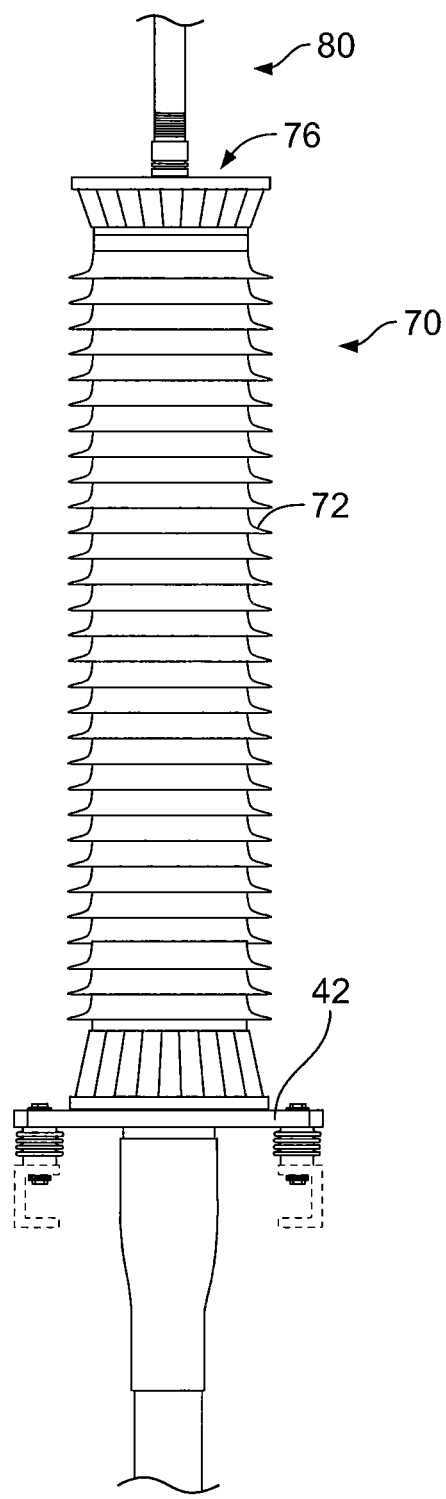
FIG. 21 is a side view of the oil-filled cable termination of FIG. 1 including an insulator housing.
Figure 22:
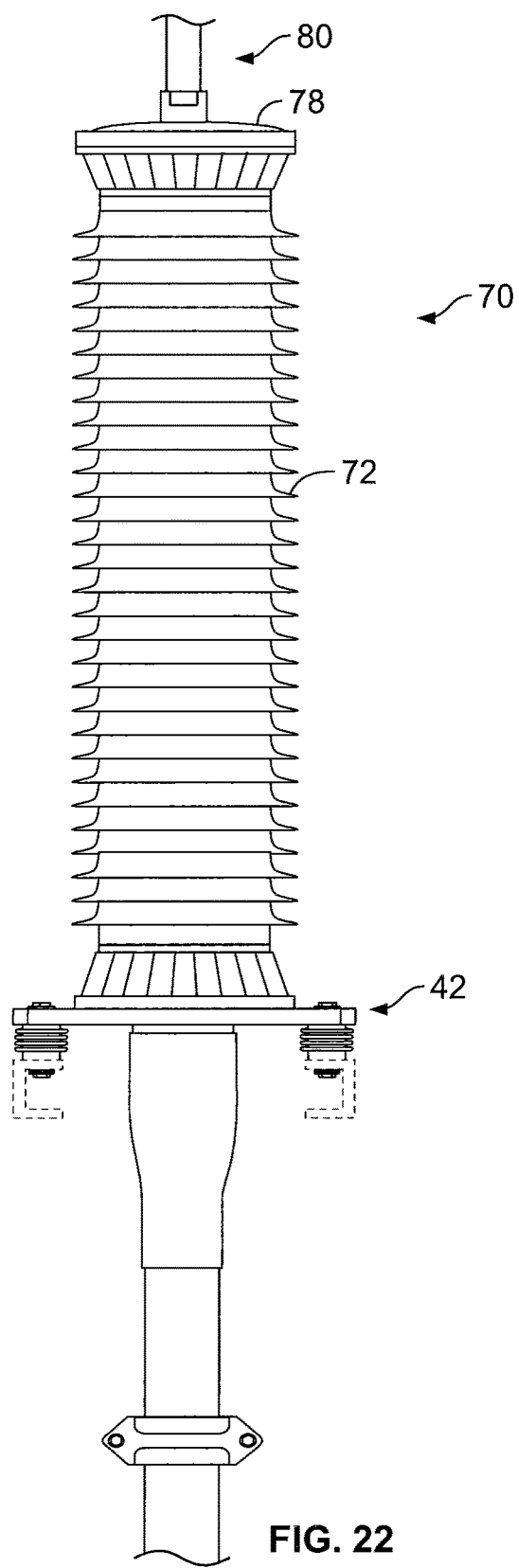
FIG. 22 is a side view of the oil-filled cable termination of FIG. 21 with a top plate installed on the insulator housing.

Referring to FIGS. 20-22, a groove 54 may be defined in the cable gland 44 (e.g., in the cable gland plate portion 48) and an o-ring 56 may be held in the groove 54. The insulator housing 72 is coupled to the base plate 42 to surround the cable 20, the cable gland 44, the stress cone 60, the oil barrier system 100, and the seal system 200. The housing 72 may be coupled to the base plate 42 with the o-ring 56 forming a seal therebetween. Oil is received through an opening 76 in the top of the insulator housing 72 to at least partially fill the housing 72 with oil. A top plate 78 is installed on the insulator housing 72.

As understood by those skilled in the art, the base plate 42 may be connected to the grounding system of a tower or other structure.

Referring to FIGS. 8, 9, 12 and 16A, the second oil barrier layer 104 (where used) may extend below a top 47 of the cable gland 44 or the tubular portion 46 thereof. For example, the second end portion 104B of the second oil barrier layer 104 may be below the top 47 of the cable gland 44 or the tubular portion 46 thereof.

Referring to FIGS. 10, 11, 13 and 16B, the first oil barrier layer 102 may extend below the top 47 of the cable gland 44 or the tubular portion 46 thereof. For example, the second end portion 102B of the first oil barrier layer 102 may be below the top 47 of the cable gland 44 or the tubular portion 46 thereof. The second oil barrier layer 104 (where used) may extend above the top 47 of the cable gland 44 or the tubular portion 46 thereof. For example, the first end portion 104A of the second oil barrier layer 104 may be above the top 47 of the cable gland 44 or the tubular portion 46 thereof.

Referring again to FIG. 1, the oil 74 in the insulator housing 70 directly contacts the oil barrier system 100. For example, the oil 74 may directly contact the first oil barrier layer 102 (FIGS. 8-13) above the stress cone 60 (FIG. 1).

In known oil-filled terminations, interaction between the oil and the cable insulation layer may be detrimental to the performance of the cable due to loss in dielectric performance. It has been observed that certain oils tend to impregnate and/or degrade the cable insulation layer that may include, for example, EPR.

The present invention uses at least one heat shrinkable tube or cold applied tube or sleeve as an oil barrier system that provides an oil barrier layer between the cable and the oil. The use of such an oil barrier layer along the cable preparation area that would otherwise come into contact with oil helps to eliminate oil impregnation and/or degradation issues with respect to the cable.

Further, the oil barrier system may eliminate the need for one or more components presently used in oil-filled termination preparation kits. For example, as described above, the oil barrier system may include an oil barrier layer that overlaps each of the cable and the lug. This may provide a seal between the cable and the lug and eliminate the need for an additional seal such as the one described above in reference to FIG. 19. Also, the oil barrier system may include a semiconductor layer as described above in reference to FIGS. 8-13. This may eliminate the need for semiconductor tape to be wrapped from the cable neutral wires to the cable semiconductor layer and accordingly reduce overall installation time.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. An assembly for use with an oil-filled cable termination, the assembly comprising:
    a cable gland;
    a base plate, wherein the cable gland is on the base plate;
    a cable received in the cable gland, the cable comprising a central conductor and a polymeric insulation layer surrounding the central conductor;
    a stress cone received around the cable and spaced apart from the cable gland;
    a lug spaced apart from the stress cone, the lug comprising a first end portion comprising a barrel and an opposite second end portion, with the central conductor of the cable received in the barrel;
    an oil barrier system comprising an oil barrier layer surrounding the polymeric insulation layer of the cable between the stress cone and the lug; and
    an insulator housing mounted on the base plate and/or the cable gland and surrounding the stress cone and at least a portion of the cable gland and the first end portion of the lug, wherein the insulator housing is configured to receive and hold oil with the oil directly contacting the oil barrier layer.

2. The assembly of claim 1 wherein the oil barrier layer comprises a heat shrinkable tube.

3. The assembly of claim 1 wherein the oil barrier layer comprises a cold shrinkable sleeve.

4. The assembly of claim 1 wherein the oil barrier layer comprises an electrically insulating layer.

5. The assembly of claim 1 wherein the oil barrier layer extends between the cable gland and the lug.

6. The assembly of claim 1 wherein the oil barrier layer comprises a first end portion and an opposite second end portion with the first end portion surrounding at least a portion of the barrel of the lug.

7. The assembly of claim 1 wherein:
    the oil barrier layer is a first oil barrier layer comprising a first end portion and an opposite second end portion;
    the oil barrier system comprises a second oil barrier layer comprising a first end portion and an opposite second end portion; and
    the first end portion of the second oil barrier layer overlaps and/or contacts the second end portion of the first oil barrier layer.

8. The assembly of claim 7 wherein the stress cone surrounds the first end portion of the second oil barrier layer and/or the second end portion of the first oil barrier layer.

9. The assembly of claim 7 wherein the second oil barrier layer is a semiconductor layer.

10. The assembly of claim 7 wherein the second oil barrier layer comprises one of a heat shrinkable tube and a cold shrinkable sleeve.

11. The assembly of claim 1 wherein:
    the oil barrier layer is a first oil barrier layer;
    the oil barrier system comprises a second oil barrier layer; and
    the first oil barrier layer overlaps and/or contacts the second oil barrier layer.

12. The assembly of claim 11 wherein:
    the first oil barrier layer comprises a first end portion and an opposite second end portion;
    the second oil barrier layer comprises a first end portion and an opposite second end portion;
    the second end portion of the first oil barrier layer extends below a top of the cable gland; and
    the first end portion of the second oil barrier layer extends above the top of the cable gland.

13. A method for preparing an oil-filled cable termination assembly, the method comprising:
    providing a cable having a distal end portion and comprising a central conductor and a polymeric insulation layer surrounding the central conductor;
    installing an oil barrier layer on the polymeric insulation layer of the cable;
    receiving the cable in a cable gland;
    receiving a stress cone around the cable with the stress cone spaced apart from the cable gland;
    receiving the cable gland on a base plate;
    mounting an insulator housing on the base plate and/or the cable gland; and
    filling an interior cavity of the insulator housing with oil such that the oil directly contacts the oil barrier layer;
    wherein:
    the oil barrier layer comprises a first end portion and an opposite second end portion;
    the first end portion of the oil barrier layer is at the distal end portion of the cable; and
    the oil barrier layer extends from the distal end portion of the cable to the stress cone.

14. The method of claim 13 further comprising:
    removing a portion of the cable insulation layer to expose the cable central conductor at the distal end portion of the cable; and
    receiving the exposed cable central conductor in a barrel of a lug.

15. The method of claim 14 wherein:
    the step of receiving the exposed cable central conductor in a barrel of a lug is carried out before the step of installing an oil barrier layer on the polymeric insulation layer of the cable; and
    the first end portion of the oil barrier layer overlaps and/or contacts an outer surface of the barrel of the lug.

16. The method of claim 13 wherein the oil barrier layer is a first oil barrier layer, the method further comprising installing a second oil barrier layer on the cable, wherein one of the first and second oil barrier layers overlaps and/or contacts the other one of the first and second oil barrier layers.

17. The method of claim 13 wherein installing an oil barrier layer on the polymeric insulation layer of the cable comprises heating a heat shrinkable tube such that the oil barrier layer conforms to the polymeric insulation layer of the cable.

18. The method of claim 13 wherein installing an oil barrier layer on the polymeric insulation layer of the cable comprises applying a cold applied sleeve such that the oil barrier layer conforms to the polymeric insulation layer of the cable.

\* \* \* \* \*